Patented Dec. 9, 1941

2,265,324

UNITED STATES PATENT OFFICE 2,265,324

MODIFIED RUBBER

David Spence, Monterey, Calif., assignor to The B. F. Goodrich Company, New York, N. Y., a corporation of New York No Drawing. Application November 11, 1936, Serial No. 110,316

3 Claims. (Cl. 260—768)

This invention relates to the art of rubber manufacture and has as its principal object the provision of a new method for producing vulcanized rubber from latex.

The preparation of plastic products by the heat treatment (or so-called depolymerization) of rubber is well known and the conversion of rubber into plastic products by the heat treatment of rubber in the presence of compounds of both organic and inorganic character has been the subject of numerous patents. These prior processes have all been carried out in the presence of air, that is, in the presence of gaseous oxygen, and their results are generally dependent on an oxidative break-down of the complex rubber macromolecule.

This invention is based on the observation that entirely different products are obtained when the reactions are carried out in complete exclusion of air and that, for example, by heating latex in the absence of air with a reagent capable of undergoing reduction under the particular conditions chosen, products are obtained in which the plastic-elastic and solubility properties are those characteristic of a partially or completely vulcanized rubber rather than of raw rubber. Thus, when a neutral latex is heated with potassium ferricyanide in a sealed container in the absence of air, the rubber is converted into an elastic product having the properties of vulcanized rubber. This product is more or less insoluble in the ordinary solvents for raw rubber, swelling therein like vulcanized rubber, but not dissolving. When air is present, on the other hand, rubber is converted into a plastic mass, very readily and completely soluble in solvents for raw rubber and with very little of the elastic quality of the original rubber. This effect upon the physical character of the rubber resulting from the treatment of latex with reducible reagents in the absence of air has never before been observed and the present invention is particularly directed to the treatment of dispersed rubber with these reagents in the absence of air.

It has been found that a large number of substances are effective in this process and can be employed to bring about these physical changes to which we have referred, resulting from the treatment of latex in the absence of air. Water-soluble inorganic and metallo-organic compounds of the polyvalent heavy metals are particularly effective, especially those in which the metal forms part of a complex negatively charged ion, but similar results are also brought about when the latex is treated with certain reducible substances of organic character in the absence of air. It is extremely difficult to define broadly the character and nature of all such substances which bring about these physical transformations in the rubber itself. In general, however, it may be said that only such compounds of metals are effective as are reduced in the process of treatment of the latex from a higher to a lower valency state. Thus, certain ferric compounds of iron are particularly useful whereas the corresponding ferrous compounds are without effect and we have observed that in the treatment of latex with ferric compounds, such as potassium ferricyanide, the iron may be completely reduced to the ferrous form. Similarly only such organic compounds are effective in this treatment of latex in absence of air as are reduced from a higher to a lower state of oxidation during the process.

The important point is that these results which I have described are not obtained in presence of air, which under identical conditions brings about a rapid depolymerization or breaking down of the rubber molecule into more or less plastic, readily soluble products. This remarkable difference can perhaps be explained on the assumption that in the absence of air the reducible reagents effect a dehydrogenation of the rubber, with an accompanying increase in complexity of structure, while in the presence of air they effect or catalyze oxidative breakdown of the rubber.

In carrying out the process with latex, the best results are attained when the latex is substantially neutral in reaction, and the presence of an excess of alkali as in the case of ammonia-preserved latex may more or less completely destroy the effect. Similarly, certain substances present in the serum of natural latex may also tend to reduce the effect or to increase the amount of agent required to bring about any desired result. It is therefore preferred to employ latex from which these serum constituents and the ammonia of ammonia-preserved latex have been largely removed and to stabilise the latex against coagulation during treatment by adding thereto and in addition to the reagent employed a suitable buffer solution, preferably M/20 mono basic phosphate buffer to which the requisite amount of alkali has been added to bring the latex as a whole to substantial neutrality or to a pH of not over 10 before treatment.

The treatment may be carried out in any closed receptacle from which the air can be conveniently and completely removed. The more completely the air is removed from the latex and from the receptacle containing it, the more complete is the physical transformation in the character of the product produced. It is therefore preferred to employ containers such that the air can be removed from the latex or the like by vacuum and subsequent replacement by means of oxygen-free nitrogen, before the latex is heated.

The action proceeds slowly at room temperature but at 100° C. results are brought about in a matter of a few hours' time, depending on the concentration of the latex and the nature and amount of the agent employed in relation to the volume of latex and the rubber content thereof. It is desirable to employ only such amount of agent as will be completely reduced by the latex in any given time. Thus, for example, 1.5% of potassium ferricyanide added to a 40% latex (calculated on the rubber therein) should be sufficient to convert the same in 8 hours at 100° C. into a tough elastic product, more or less insoluble in benzol with the complete reduction of the ferric iron to the ferrous form. A larger quantity may be used and is sometimes desirable.

Experience has taught that when these metallic reagents are completely reduced or when any excess thereof is completely removed from the products by thorough washing after treatment, products of maximum stability are obtained, and by the introduction of suitable antioxidants, the age-resisting properties of these modified rubbers are still further improved.

Products prepared by the treatment of latex in the absence of air in this way are all more or less insoluble in the ordinary solvents for raw rubber, the degree of solubility and of swelling of the same depending on the extent of the conversion effected. Unlike the products of similar treatment in presence of air, these conversion products are tough but still elastic.

As examples, the following may be cited, the proportions being based on the rubber content of the latex in each instance:

(a) A quantity of neutral buffered latex containing 25% of rubber, prepared from commercial 60% ammonia-preserved latex concentrate by dialysis against M/20 neutral phosphate buffer was heated for 16 hours at 100° C. with 9% of potassium ferricyanide in a sealed container from which the air had been removed and replaced by nitrogen. The coagulum, after washing and drying, was a tough, elastic, transparent brown product, 85% of which was insoluble in benzol in 14 days. Heated in an open container, the product was a soft oily mass.

(b) A quantity of similar, neutral buffer latex of 40% concentration was heated with 5% of potassium ferricyanide for 12 hours at 100° C. in a sealed can, completely filled with latex. The resulting product was completely coagulated. After washing and drying the product was a short and tough, elastic mass, 72% of which was insoluble in benzol in 14 days. The swelling index (that is, the ratio of the final swollen volume in cubic centimeters of the portion remaining insoluble after 14 days' immersion in benzol, to the original weight in grams of the sample) of this material was 33 as compared with 95 for the untreated latex product.

(c) A 20% neutral buffered latex was heated with 1.7% of potassium ferricyanide to the rubber for 4 hours at 100° C. in a sealed tube containing nitrogen. The product was tough and elastic and in benzol 72% remained undissolved after 14 days. This product had a swelling index of 51 as compared with 89 for the untreated rubber from this latex. The product of another sample of the latex, heated for 17½ hours and similarly treated, was 91% insoluble and had a swelling index of 22. Heated in an open container, the rubber was converted into a soft, plastic product completely soluble in benzol, the benzol solution having very little viscosity.

(d) A quantity of neutral, buffered latex of 4% concentration was heated with 0.5% of $HgCl_2$ in a sealed tube with nitrogen for 5 hours at 100° C. The latex was finally coagulated by acid and the product washed and dried. Whereas a sample of rubber prepared from this same latex by acid coagulation without prior treatment had a swelling index of 94 and only 30% insoluble in benzol in 14 days, this treated product had a swelling index of 26 and was 78% insoluble in benzol in the same time period.

(e) Another product prepared by the treatment for 5 hours at 100° C. of a 40% neutral, buffered latex with 0.25% of ferric chloride in the absence of air was 58% insoluble in benzol with a swelling index of 26 as compared with 85 for the untreated control sample.

(f) A quantity of neutral, buffered latex was heated for 5 hours at 90° C. with 5% of benzoquinone in a sealed container from which the air had been removed. The latex was afterwards coagulated and the dry coagulum compared with the product from the same latex untreated and similarly treated in the presence of air. The product prepared by this heat treatment in the presence of quinone and in absence of air was a tough, elastic mass 83% of which was quite insoluble in benzol in 14 days and had a swelling index of 22. The product prepared in the same way but in the presence of air was only 22% insoluble and had a swelling index even greater than the swelling index (105) of the original untreated sample of which 38% remained undissolved after 14 days.

(g) A neutral buffered latex, to which 5% of benzoyl peroxide was added was heated 5 hours at 100° C. in a sealed container from which the air had been replaced by nitrogen. The latex was afterwards poured on porous tiles to coagulate. The resulting product after acetone extraction and drying was a "short," tough elastic rubber 95% of which was quite insoluble in benzol and having a swelling index of 16 as compared with the coagulum from this same latex untreated only 38% of which was insoluble in benzol and which had a swelling index of 100. When heated in open air with benzoyl peroxide the product of this latex was a soft, plastic mass, completely soluble in benzol, the benzol solution having a very low viscosity compared with that of the original rubber.

(h) To a neutral buffered latex was added 5% of quinone di-imide prepared from p-phenylene diamine. One-half of this latex was coagulated on the tile without treatment while the other half was immediately sealed in a vacuum tube containing nitrogen and heated for 4½ hours at 100° C. Whereas the unheated control product was 50% insoluble in benzol in 14 days and had a swelling index of 110 the rubber of this latex heated with this di-imide in absence of air was 76% insoluble in benzol and had a swelling index of 53. On account of the very unstable character of this material in presence of air, it is extremely difficult to avoid oxidation in process of handling.

(j) Another lot of neutral buffered latex was mixed with 5% of quinone dichlor-di-imide and heated for 5 hours in a nitrogen bomb at 100° C. The latex was afterwards poured on a porous tile to coagulate, also a sample containing the quinone dichlor-di-imide but without heat treatment. The rubber prepared from this latex without treatment was 54% insoluble in benzol in 14 days and had a swelling index of 104 whereas the product heated in the absence of air was a short, tough, brown elastic mass absolutely insoluble in benzol and having a swelling index of 7.

In the absence of air in every case, the rubber of the latex was converted into a soft, plastic product readily soluble in benzol.

While the invention has been described in considerable detail with reference to certain preferred procedures and materials, it is to be understood that numerous modifications and variations therein may be made without departing from the spirit and scope of the invention as defined in the following claims.

I claim:

1. The method of treating a rubber latex to effect a change in the physical properties of the rubber similar at least to some of the changes effected by vulcanization which comprises heating the latex in substantially neutral condition with potassium ferricyanide in the substantial absence of oxygen.

2. The method of treating a natural latex which consists in first treating the latex to remove a substantial portion of the water soluble constituents present in the serum thereof, replacing same by a buffer solution having a pH of not over 10, then heating the latex with potassium ferricyanide in the substantial absence of oxygen.

3. The method of imparting to rubber at least some of the physical properties of a vulcanized rubber which comprises heating an aqueous dispersion of the rubber in the substantial absence of oxygen with a material selected from the class consisting of potassium ferricyanide, ferric chloride, and mercuric chloride.

DAVID SPENCE.

CERTIFICATE OF CORRECTION.

Patent No. 2,265,324. December 9, 1941.

DAVID SPENCE.

It is hereby certified that error appears in the printed specification of the above numbered patent requiring correction as follows: Page 3, first column, line 9, for "absence" read --presence--; and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.